(12) United States Patent
Aoki et al.

(10) Patent No.: US 6,819,473 B2
(45) Date of Patent: Nov. 16, 2004

(54) OPTICAL FIBER CHROMATIC DISPERSION DISTRIBUTION MEASURING APPARATUS AND MEASURING METHOD

(75) Inventors: Shoichi Aoki, Tokyo (JP); Sinya Nagashima, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 306 days.

(21) Appl. No.: 09/997,969

(22) Filed: Nov. 29, 2001

(65) Prior Publication Data

US 2002/0089736 A1 Jul. 11, 2002

(30) Foreign Application Priority Data

Nov. 29, 2000 (JP) .................................. P2000-363809

(51) Int. Cl.⁷ ..................... G02F 1/365; G01N 21/63; G01B 9/02
(52) U.S. Cl. ..................... 359/326; 385/15; 356/73.1; 356/477; 356/484
(58) Field of Search ................. 359/326–332; 385/12, 15, 122, 123; 356/73.1, 477, 484, 485; 250/551, 227.18, 227.23

(56) References Cited

U.S. PATENT DOCUMENTS

| | | | | |
|---|---|---|---|---|
| 4,984,884 A | * | 1/1991 | Ryu et al. | 356/73.1 |
| 5,638,176 A | * | 6/1997 | Hobbs et al. | 356/396 |
| 5,657,148 A | * | 8/1997 | Feuer et al. | 359/263 |
| 5,956,131 A | * | 9/1999 | Mamyshev et al. | 356/73.1 |
| 6,580,499 B2 | * | 6/2003 | Aoki et al. | 356/73.1 |
| 6,580,500 B2 | * | 6/2003 | Aoki et al. | 356/73.1 |
| 6,587,607 B2 | * | 7/2003 | Aoki et al. | 385/15 |
| 6,594,005 B2 | * | 7/2003 | Aoki et al. | 356/73.1 |
| 6,643,603 B2 | * | 11/2003 | Aoki et al. | 702/127 |
| 2002/0064335 A1 | * | 5/2002 | Aoki et al. | 385/15 |
| 2002/0101579 A1 | * | 8/2002 | Aoki et al. | 356/73.1 |
| 2002/0105634 A1 | * | 8/2002 | Aoki et al. | 356/73.1 |
| 2002/0107655 A1 | * | 8/2002 | Aoki et al. | 702/127 |
| 2002/0113956 A1 | * | 8/2002 | Aoki et al. | 356/73.1 |
| 2002/0122171 A1 | * | 9/2002 | Aoki et al. | 356/73.1 |
| 2002/0131037 A1 | * | 9/2002 | Aoki et al. | 356/73.1 |

FOREIGN PATENT DOCUMENTS

| | | | | |
|---|---|---|---|---|
| EP | 1 211 499 A2 | * | 6/2002 | G01M/11/00 |
| EP | 1 219 945 A2 | * | 7/2002 | G01M/11/00 |
| JP | Hei 10-83006 | | 3/1998 | G02F/1/35 |

* cited by examiner

Primary Examiner—John D. Lee
(74) Attorney, Agent, or Firm—Fish & Richardson P.C.

(57) ABSTRACT

An optical fiber chromatic dispersion distribution measuring apparatus for measuring the chromatic dispersion distribution of an optical fiber under test comprising two light sources at least one of which can change wavelength thereof, wherein light beams having different wavelengths from each other and emitted from the two light sources are inputted to the optical fiber under test to measure a four-wave mixing light beam generated by interaction between the two light beams by optical time domain reflectometer (OTDR); wherein an optical bandpass filter having a fixed center wavelength is provided at a previous stage of the optical time domain reflectometer (OTDR); and wherein a coherence controller for controlling coherence of at least one of the light beams outputted from the two light sources.

7 Claims, 2 Drawing Sheets

OPTICAL FIBER CHROMATIC DISPERSION DISTRIBUTION MEASURING APPARATUS AND MEASURING METHOD

BACKGROUND OF THE INVENTION

1. Filed of the Invention

The present invention relates to an optical fiber chromatic dispersion distribution measuring apparatus for measuring the chromatic dispersion distribution of an optical fiber and a measuring method.

2. Description of the Related Art

It is known that when two pulse light beams having different wavelengths $\lambda_1$, $\lambda_2$ from each other are simultaneously inputted to an optical fiber under test, four-wave mixing light beams are generated due to interaction between the two inputted pulse light beams.

A relation among the wavelengths $\lambda_1$, $\lambda_2$ of the pulse light beams and wavelengths $\lambda_3$, $\lambda_4$ of the four-wave mixing light beams is shown in FIG. 2.

In FIG. 2, the longitudinal axis indicates the wavelength of each of light beams and the transverse axis indicates the intensity of each of light beams. Symbols a and b indicate the pulse light beams having the wavelength $\lambda_1$ and $\lambda_2$, respectively. Symbols c and d indicate the four-wave mixing light beams having wavelengths $\lambda_3$ and $\lambda_4$, respectively. The wavelengths $\lambda_1$, $\lambda_2$, $\lambda_3$, and $\lambda_4$ satisfy the following relation:

$$\lambda_1 - \lambda_3 = \lambda_4 - \lambda_2 = \lambda_2 - \lambda_1 = \lambda_0 \text{ ($\lambda_0$ is about 5 to 10 nm)}$$

An interval between the wavelengths of the pulse light beams (that is, $\lambda_2 - \lambda_1 = \lambda_0$) is the smaller, the intensity of the four-wave mixing light beams are the larger.

An optical fiber chromatic dispersion distribution measuring apparatus according to a related art extracts either one of the four-wave mixing light beams having the wavelengths $\lambda_3$ and $\lambda_4$ that are reflected from the optical fiber under test, by an optical bandpass filter having a variable center wavelength to execute measurement of the chromatic dispersion distribution of the optical fiber under test.

However, due to a mechanical structure of the optical bandpass filter having the variable center wavelength, a loss caused by inserting the optical bandpass filter having the variable center wavelength is more than 10 dB to decrease the measurement sensitivity.

In case of compensating the loss, which is caused by inserting the optical bandpass filter having the variable center wavelength, by using an optical amplifier, the configuration of the apparatus becomes complicate.

As shown in FIG. 2, the backscattered light beam of the four-wave mixing light beams measured by an optical time domain reflectometer (OTDR) is varied in accordance with a distance periodically. The backscattered light beam has a relation that the variation period is in proportional to the dispersion value. Therefore, the dispersion value is estimated from the variation period.

In a wave form shown in FIG. 2, a wave form X having a pulse shape indicated by a dotted line is supposed to be displayed on the optical time domain reflectometer as a far end of an optical fiber under test. However, since the obtained backscattered light beam of the four-wave mixing light beams varies periodically, the part X having pulse shape indicated by the dotted line is not clearly specified by the measuring apparatus according to the related art as shown in FIG. 2.

Consequently, the far end of the optical fiber under test is not clearly determined from the display output of the optical time domain reflectometer (OTDR). Therefore, it is problem that the far end of the optical fiber under test is difficult to be specified.

The reason for need to specify the far end of an optical fiber under test a test fiber is that the length and the refractive index of the optical fiber have such a relationship that if one parameter is known, the other can be calculated automatically. In order to know the refractive index of the optical fiber, it is necessary to know the length of the optical fiber.

SUMMARY OF THE INVENTION

It is an object of the invention to provide an optical fiber chromatic dispersion distribution measuring apparatus enabling to change interval between two wavelengths inputted and having the high sensitivity with a simple configuration and to provide an optical fiber chromatic dispersion distribution measuring apparatus which can easily determine a far end of the optical fiber under test from display of an optical time domain reflectometer (OTDR).

In order to solve the above described problem, according to a first aspect of the invention, there is provided an optical fiber chromatic dispersion distribution measuring apparatus comprising:

two light sources for outputting light beams having different wavelengths from each other, respectively, to an optical fiber under test;

an optical time domain reflectometer for measuring four-wave mixing light beams generated by an interaction between the light beams inputted to the optical fiber under test;

an optical bandpass filter having a fixed center wavelength; and a coherence controller for controlling coherence of at least one of the outputted light beams of the two light sources, wherein at least one of the two light source is a tunable light source; and the optical bandpass filter is disposed at a previous stage of the optical time domain reflectometer. Whereby the spectral line width is widened to be able to easily determine the far end of the optical fiber under test from the display output of the optical time domain reflectometer (OTDR).

According to a second aspect of the invention, there is provided an optical fiber chromatic dispersion distribution measuring apparatus comprising:

two light sources for outputting CW light beams having different wavelengths from each other, respectively;

a coherence controller for controlling coherence of at least one of the CW light beams of the two light sources;

an optical coupler for combining a plurality of light beams;

a modulator;

an optical fiber amplifier;

a directional coupler;

an optical fiber under test;

an optical bandpass filter having a fixed center wavelength; and an optical time domain reflectometer;

wherein at least one of the two light source is a tunable light source;

the two light sources output the CW light beams to the optical coupler;

the optical coupler combines the CW light beams and outputs the combined CW light beams to the modulator;

the modulator modulates the CW light beams inputted from the optical coupler to generate pulse light beams having different wavelengths from each other and outputs the pulse light beams to the optical fiber amplifier;

the optical fiber amplifier amplifies the pulse light beams and outputs the amplified pulse light beams to the directional coupler;

the directional coupler outputs the pulse light beams inputted from the optical fiber amplifier to the optical fiber under test and outputs a light beam inputted from the optical fiber under test to the optical bandpass filter;

four-wave mixing light beams are generated in the optical fiber under test due to an interaction between the pulse light beams inputted from the directional coupler and is outputted to the directional coupler;

the optical bandpass filter extracts a light beam within a specific band from the light beam inputted from the directional coupler and outputs the extracted light beam to the optical time domain refelectometer; and the optical time domain reflectometer measures the chromatic dispersion distribution of the extracted light beam.

According to a third aspect of the invention, there is provided the apparatus according to the second aspect of the invention, wherein the four-wave mixing light beams are a light beam generated in lower frequency side than the pulse light beams and a light beam generated in higher frequency side than the pulse light beams; and only one of the four-wave mixing light beams is within the specific band of the optical bandpass filter. Therefore, the four-wave mixing light beams can be selected on a basis of a relation with regard to the center wavelength of the bandpass filter.

According to a fourth aspect of the invention, there is provided An optical fiber chromatic dispersion distribution measuring method comprising the steps of:

outputting two light beams having different wavelengths from each other, respectively, to an optical fiber under test;

controlling coherence of at least one of the light beams;

generating two four-wave mixing light beams in the optical fiber under test;

measuring one of the two four-wave mixing light beams to obtain the chromatic dispersion distribution of the optical fiber under test. Whereby, the spectral line width is widened so that the far end position of the optical fiber can be easily determined from the display output of the optical time domain reflectometer.

According to a fifth aspect of the invention, there is provided an optical fiber chromatic dispersion distribution measurement method comprising the steps of:

outputting two CW light beams having different wavelengths from each other;

controlling coherence of at least one of the CW light beams;

combining the CW light beams;

modulating the CW light beams to generate two pulse light beams having the different wavelengths from each other;

amplifying the pulse light beams;

inputting the pulse light beams to an optical fiber under test to generate two four-wave mixing light beams;

extracting one of the four-wave mixing light beams; and measuring the one of the four-wave mixing light beams to obtain the chromatic dispersion distribution of the optical fiber under test.

According to a sixth aspect of the invention, there is provided the method according to the fifth aspect of the invention, further comprising the steps of adjusting both wavelengths of the two light beams so that wavelength of the one of the four-wave mixing light beams coincides with a center wavelength of an optical bandpass filter having a fixed center wavelength for executing the extracting step. Therefore, position of the far end of the optical fiber can be easily determined by using the normal optical time domain reflectometer (OTDR) without using a bandpass filter having a variable center wavelength.

According to a seventh aspect of the invention, there is provided the method according to the fifth aspect of the invention, wherein ratio of the intensity of the two CW light beams is approximately 2:1. Whereby, the optical fiber wavelength dispersion can be measured without any measurable variations in frequency under observation.

DETAILED DISCRIPTION OF THE PREFERRED EMBODIMENTS

An optical fiber chromatic dispersion distribution measuring apparatus according to the invention will be given with reference to FIG. 1.

Figure 1:
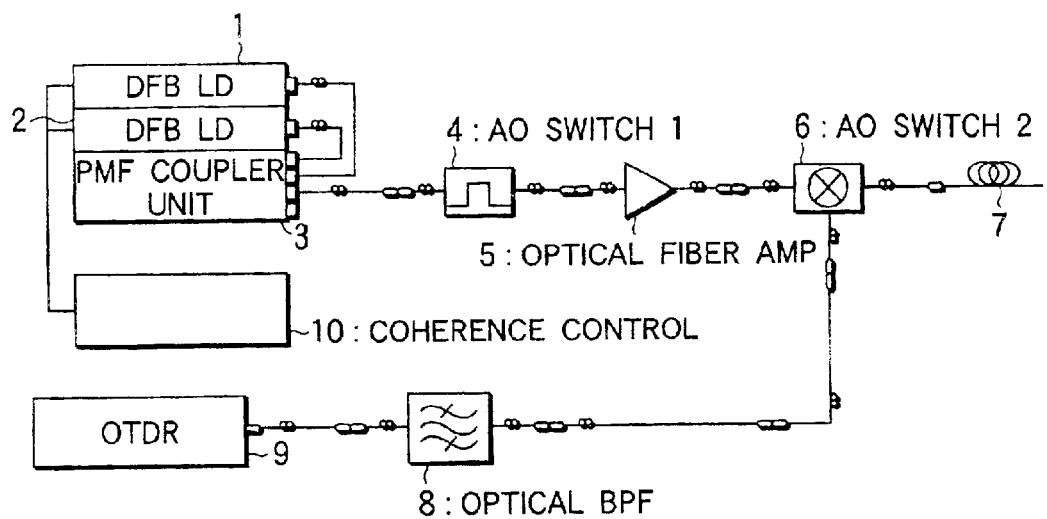
FIG. 1 shows a configuration of an optical fiber chromatic dispersion distribution measuring apparatus according to the invention.

In FIG. 1, reference numeral 1 denotes a first light source (distributed feedback laser diode (DFB LD)), reference numeral 2 denotes a second light source (DFB LD), and reference numeral 3 denotes an optical coupler (Polarization Maintaining Fiber (PMF) Coupler Unit) for combining a plurality of light beams.

Reference numeral 4 denotes an acousto-optic element (first acousto-optic (AO) switch), reference numeral 5 denotes an optical fiber amplifier (Optical Fiber AMP), reference numeral 6 denotes a directional coupler (second acousto-optic (AO) switch, reference numeral 7 denotes a optical fiber under test, reference numeral 8 denotes an optical bandpass filter (Optical BPF), and reference numeral 9 denotes an optical time domain reflectometer (OTDR).

Also, reference numeral 10 is a coherence controller for controlling coherence of wavelength of at least one of outputted light beams of the light source 1 and the light source 2.

The light sources 1, 2 output continuous wave (CW) light beams having wavelengths $\lambda_1$, $\lambda_2$ to the optical coupler 3, respectively. At this time, the coherence controller 10 controls coherence of at least one of the wavelength $\lambda_1$, $\lambda_2$ of the outputted light beams of the light sources 1,2 to widen the spectrum line width of the outputted light beam. The wavelengths $\lambda_1$ and $\lambda_2$ are different from each other. The optical coupler 3 combines the CW light beams to output the combined CW light beams to the acousto-optic element 4. The acousto-optic element 4 modulates the CW light beams to generate pulse light beams having wavelength $\lambda_1$, $\lambda_2$, respectively, and outputs the pulse light beams to the optical fiber amplifier 5. The optical fiber amplifier 5 amplify the pulse light beams and output the amplified pulse light beams to the directional coupler 6. The directional coupler 6 outputs the pulse light beams inputted from the optical fiber amplifier 5 to the optical fiber under test 7 and outputs a light beam inputted from the optical fiber under test 7 to the optical bandpass filter 8. The optical bandpass filter 8 extracts and outputs a light beam within a specific band to the optical time domain reflectometer 9. The optical time domain reflectometer 9 measures the extracted light beam from the optical bandpass filter 8 to execute measurement of the chromatic dispersion distribution of the optical fiber under test 7.

At least one of the light sources 1, 2 can change the wavelength of the light beam outputted therefrom (that is, at least one of the light sources 1, 2 is a variable light source).

When a pulse light beam having wavelength $\lambda_1$ and an pulse light beam having wavelength $\lambda_2$ are inputted to the optical fiber under test 7, four-wave mixing light beams are generated in that fiber under test 7 by the interaction between the two pulse light beams.

Figure 3:
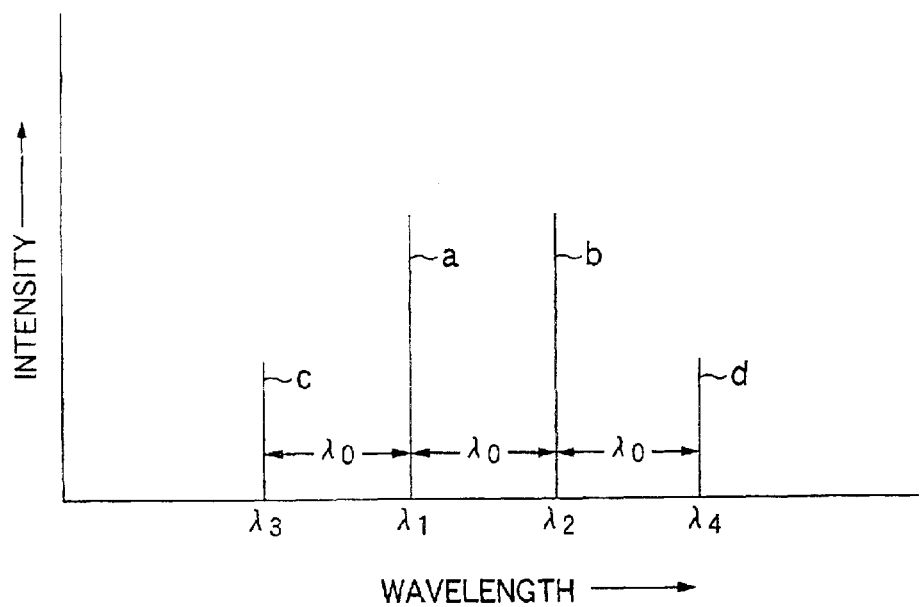
FIG. 3 shows a relation between light beams having wavelengths $\lambda_1$, $\lambda_2$ from two light sources and a four-wave mixing light beam in the wavelength.

In this case, a relation among the inputted light beams having wavelengths $\lambda_1$ and $\lambda_2$ and the four-wave mixing light is the same as the relation in the related art and is shown in FIG. 3.

In FIG. 3, the horizontal axis of the graph indicates the wavelength of an pulse light beam and the vertical axis indicates the intensity of the pulse light beam. Symbols a and b indicate the inputted pulse light beams having the wavelength $\lambda_1$, $\lambda_2$ respectively and the wavelengths $\lambda_1$ and $\lambda_2$ satisfy the following relationship:

$$\lambda_2-\lambda_1=\lambda_0 \text{ (where } \lambda_0 \text{ is about 5–10 nm)}$$

Symbols c and d indicate the four-wave mixing light beams generated by the interaction between the two light beams having the wavelengths $\lambda_1$, $\lambda_2$, respectively. The four-wave mixing light beams have wavelengths $\lambda_3$ and $\lambda_4$, which satisfy the following relationship:

$$\lambda_1-\lambda_3=\lambda_4-\lambda_2=\lambda_2-\lambda_1=\lambda_0$$

Interval between the wavelengths of the light beams inputted ($\lambda_2-\lambda_1=\lambda_0$) is the smaller, the intensity of the four-wave mixing light beams (the light beams having the wavelength $\lambda_3$ and $\lambda_4$) is the larger.

One of the four-wave mixing light beams having the wavelengths $\lambda_3$ and $\lambda_4$ generated by the interaction between the light beams having the different wavelengths $\lambda_1$ and $\lambda_2$ is extracted by the optical bandpass filter 8 and measured with the optical time domain reflectometer (OTDR) to measure the chromatic dispersion distribution of the optical fiber under test.

At this time, in order to increase the measurement sensitivity in the optical time domain reflectometer (OTDR), it is necessary to accurately extract the four-wave mixing light (at $\lambda_3$ or $\lambda_4$) by the optical bandpass filter 8.

To accurately extract the four-wave mixing light ($\lambda_3$), the extraction band of the optical bandpass filter may be comparatively broad so long as interval between the four-wave mixing light ($\lambda_3$) and the adjacent $\lambda_1$ is large. However, the interval between $\lambda_3$ and $\lambda_1$ become large and the interval between $\lambda_1$ and $\lambda_2$ become large. As a result, the intensity of the four-wave mixing light ($\lambda_3$) becomes small.

This means a trade-off between broadening the extraction band and increasing the intensity of the extracted four-wave mixing light ($\lambda_3$ or $\lambda_4$).

Comparing to an optical bandpass filter having a fixed center wavelength, an optical bandpass filter having a variable center wavelength has a broader extraction band (it is difficult to obtain a filter having a narrow extraction band) and a greater loss.

Therefore, the present invention is characterized in that the optical bandpass filter 8 has a fixed center wavelength (viz. has a narrow extraction band and lower loss).

In the present invention, an optical bandpass filter having a fixed center wavelength is used as the optical bandpass filter 8. If the wavelengths $\lambda_1$ and $\lambda_2$ of the light beams emitted from the light sources 1 and 2 are fixed, one may choose a bandpass filter having a center wavelength fitting either one of the fixed wavelengths $\lambda_1$ and $\lambda_2$.

However, the wavelengths of the light beams from the light sources 1 and 2 may be changed. Therefore, in the present invention, at least one of the wavelengths $\lambda_1$ and $\lambda_2$ of the light beams from the two light sources 1 and 2 may be adjusted so that the four-wave mixing light ($\lambda_3$) coincides with the fixed center wavelength of the optical bandpass filter 8.

Also, the ratio of the intensity of the light beams from the two light sources 1 and 2 to the optical fiber under test is adjusted to approximately 2:1 (the intensity of the light beams having wavelengths $\lambda_1$, $\lambda_2$ is set so that $\lambda_1:\lambda_2=2:1$ or $\lambda_1:\lambda_2=1:2$). Whereby the optical fiber wavelength dispersion can be measured without causing any measurable variations in frequency under observation by the optical time domain relectometer.

Accordingly, the optical fiber chromatic dispersion distribution measuring apparatus according to the invention can realize measurement with high measurement sensitivity by using simple configuration.

Since the insertion loss of the optical bandpass filter having the fixed center wavelength is about 5 dB, an improvement is about 5 dB in comparison with the insertion loss 10 dB of an optical bandpass filter having a variable center wavelength.

Figure 2:
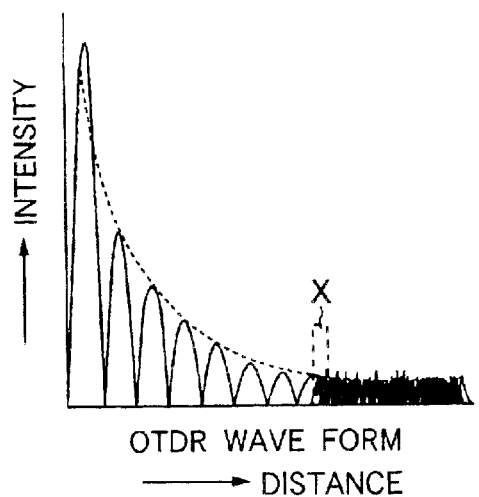
FIG. 2 shows an output wave form from an optical time domain reflectometer (OTDR).

The coherence of at least one of wavelengths of the outputted light beams of the first and second light sources 1, 2 is controlled by the coherence controller 10 shown in FIG. 1 to widen the spectral line width of the outputted light beams, whereby as shown in FIG. 2, a wave form X having pulse shape indicated by dotted line is displayed as a far end of the optical fiber under test 7 on the optical time domain relectometer (OTDR). The coherence controller 10 can widen the spectral line width of a light beam, which generally is about 5 MHz, up to about 50 MHz.

Accordingly, the far end of the optical fiber under test 7 can be clearly determined from the display output of the optical time domain reflectometer (OTDR).

According to a first aspect of the invention, there is provided an optical fiber chromatic dispersion distribution measuring apparatus comprising:

two light sources for outputting light beams having different wavelengths from each other, respectively, to an optical fiber under test;

an optical time domain reflectometer for measuring four-wave mixing light beams generated by an interaction between the light beams inputted to the optical fiber under test;

an optical bandpass filter having a fixed center wavelength; and a coherence controller for controlling coherence of at least one of the outputted light beams of the two light sources, wherein at least one of the two light source is a tunable light source; and the optical bandpass filter is disposed at a previous stage of the optical time domain reflectometer. Whereby the spectral line width is widened to be able to easily determine the far end of the optical fiber under test from the display output of the optical time domain reflectometer (OTDR).

According to a second aspect of the invention, there is provided an optical fiber chromatic dispersion distribution measuring apparatus comprising:

two light sources for outputting CW light beams having different wavelengths from each other, respectively;

a coherence controller for controlling coherence of at least one of the CW light beams of the two light sources;

an optical coupler for combining a plurality of light beams;

a modulator;

an optical fiber amplifier;

a directional coupler;

an optical fiber under test;

an optical bandpass filter having a fixed center wavelength; and an optical time domain reflectometer;

wherein at least one of the two light source is a tunable light source;

the two light sources output the CW light beams to the optical coupler;

the optical coupler combines the CW light beams and outputs the combined CW light beams to the modulator;

the modulator modulates the CW light beams inputted from the optical coupler to generate pulse light beams having different wavelengths from each other and outputs the pulse light beams to the optical fiber amplifier;

the optical fiber amplifier amplifies the pulse light beams and outputs the amplified pulse light beams to the directional coupler;

the directional coupler outputs the pulse light beams inputted from the optical fiber amplifier to the optical fiber under test and outputs a light beam inputted from the optical fiber under test to the optical bandpass filter;

four-wave mixing light beams are generated in the optical fiber under test due to an interaction between the pulse light beams inputted from the directional coupler and is outputted to the directional coupler;

the optical bandpass filter extracts a light beam within a specific band from the light beam inputted from the directional coupler and outputs the extracted light beam to the optical time domain refelectometer; and the optical time domain reflectometer measures the chromatic dispersion distribution of the extracted light beam.

According to a third aspect of the invention, there is provided the apparatus according to the second aspect of the invention, wherein the four-wave mixing light beams are a light beam generated in lower frequency side than the pulse light beams and a light beam generated in higher frequency side than the pulse light beams; and only one of the four-wave mixing light beams is within the specific band of the optical bandpass filter. Therefore, the four-wave mixing light beams can be selected on a basis of a relation with regard to the center wavelength of the bandpass filter.

According to a fourth aspect of the invention, there is provided An optical fiber chromatic dispersion distribution measuring method comprising the steps of:

outputting two light beams having different wavelengths from each other, respectively, to an optical fiber under test;

controlling coherence of at least one of the light beams;

generating two four-wave mixing light beams in the optical fiber under test;

measuring one of the two four-wave mixing light beams to obtain the chromatic dispersion distribution of the optical fiber under test. Whereby, the spectral line width is widened so that the far end position of the optical fiber can be easily determined from the display output of the optical time domain reflectometer.

According to a fifth aspect of the invention, there is provided an optical fiber chromatic dispersion distribution measurement method comprising the steps of:

outputting two CW light beams having different wavelengths from each other;

controlling coherence of at least one of the CW light beams;

combining the CW light beams;

modulating the CW light beams to generate two pulse light beams having the different wavelengths from each other;

amplifying the pulse light beams;

inputting the pulse light beams to an optical fiber under test to generate two four-wave mixing light beams;

extracting one of the four-wave mixing light beams; and measuring the one of the four-wave mixing light beams to obtain the chromatic dispersion distribution of the optical fiber under test.

According to a sixth aspect of the invention, there is provided the method according to the fifth aspect of the invention, further comprising the steps of adjusting both wavelengths of the two light beams so that wavelength of the one of the four-wave mixing light beams coincides with a center wavelength of an optical bandpass filter having a fixed center wavelength for executing the extracting step. Therefore, position of the far end of the optical fiber can be easily determined by using the normal optical time domain reflectometer (OTDR) without using a bandpass filter having a variable center wavelength.

According to a seventh aspect of the invention, there is provided the method according to the fifth aspect of the invention, wherein ratio of the intensity of the two CW light beams is approximately 2:1. Whereby, the optical fiber wavelength dispersion can be measured without any measurable variations in frequency under observation.

What is claimed is:

1. An optical fiber chromatic dispersion distribution measuring apparatus comprising:

two light sources for outputting light beams having different wave lengths from each other, respectively, to an optical fiber under test;

an optical time domain reflectometer for measuring four-wave mixing light beams generated by an interaction between backscattered light beams of the light beams inputted to the optical fiber under test;

an optical bandpass filter having a fixed center wavelength; and a coherence controller for controlling coherence of at least one of the outputted light beams of the two light sources, wherein at least one of the two light sources is a tunable light source; and wherein the optical bandpass filter is disposed in a stage of the apparatus between the light sources and the optical time domain reflectometer.

2. An optical fiber chromatic dispersion distribution measuring apparatus comprising:

two light sources for outputting CW light beams having different wavelengths from each other, respectively;

a coherence controller for controlling coherence of at least one of the CW light beams of the two light sources;

an optical coupler for combining a plurality of light beams;

a modulator;

an optical fiber amplifier;

a directional coupler;

an optical fiber under test;

an optical bandpass filter having a fixed center wavelength; and an optical time domain reflectometer;

wherein at least one of the two light sources is a tunable light source; the two light sources output the CW light beams to the optical coupler;

the optical coupler combines the CW light beams and outputs the combined CW light beams to the modulator;

the modulator modulates the CW light beams inputted from the optical coupler to generate pulse light beams having different wavelengths from each other and outputs the pulse light beams to the optical fiber amplifier;

the optical fiber amplifier amplifies the pulse light beams and outputs the amplified pulse light beams to the directional coupler;

the directional coupler outputs the pulse light beams inputted from the optical fiber amplifier to the optical fiber under test and outputs a light beam inputted from the optical fiber under test to the optical bandpass filter;

four-wave mixing light beams are generated in the optical fiber under test due to an interaction between the pulse light beams inputted from the directional coupler and are outputted to the directional coupler;

the optical bandpass filter extracts a light beam within a specific band from the light beam inputted from the directional coupler and outputs the extracted light beam to the optical time domain refelectometer; and the optical time domain reflectometer measures the chromatic dispersion distribution of the extracted light beam.

3. The apparatus according to claim 2, wherein the four-wave mixing light beams are a light beam generated in lower frequency side than the pulse light beams and a light beam generated in higher frequency side than the pulse light beams; and only one of the four-wave mixing light beams is within the specific band of the optical bandpass filter.

4. An optical fiber chromatic dispersion distribution measuring method comprising the steps of:

outputting two light beams having different wavelengths from each other, respectively, to an optical fiber under test;

controlling coherence of at least one of the light beams;

generating two four-wave mixing light beams in the optical fiber under test;

measuring one of the two four-wave mixing light beams to obtain the chromatic dispersion distribution of the optical fiber under test.

5. An optical fiber chromatic dispersion distribution measurement method comprising the steps of:

outputting two CW light beams having different wavelengths from each other;

controlling coherence of at least one of the CW light beams;

combining the CW light beams;

modulating the CW light beams to generate two pulse light beams having the different wavelengths from each other;

amplifying the pulse light beams;

inputting the pulse light beams to an optical fiber under test to generate two four-wave mixing light beams;

extracting one of the four-wave mixing light beams; and measuring the one of the four-wave mixing light beams to obtain the chromatic dispersion distribution of the optical fiber under test.

6. The method according to claim 5, further comprising the steps of adjusting both wavelengths of the two light beams so that wavelength of the one of the four-wave mixing light beams coincides with a center wavelength of an optical bandpass filter having a fixed center wavelength for executing the extracting step.

7. The method according to claim 5, wherein ratio of the intensity of the two CW light beams is approximately 2:1.

* * * * *

UNITED STATES PATENT AND TRADEMARK OFFICE
CERTIFICATE OF CORRECTION

PATENT NO.    : 6,819,473 B2
DATED         : November 16, 2004
INVENTOR(S)   : Shoichi Aoki and Shinya Nagashima It is certified that error appears in the above-identified patent and that said Letters Patent is hereby corrected as shown below:

<u>Title page,</u>
Item [75], Inventors, replace with the following inventorship information:
-- [75] Inventors: Shoichi Aoki, Tokyo (JP); Shinya Nagashima, Tokyo (JP) --

Signed and Sealed this

Nineteenth Day of April, 2005

JON W. DUDAS
*Director of the United States Patent and Trademark Office*